United States Patent [19]

Shiiki et al.

[11] Patent Number: 4,514,558

[45] Date of Patent: Apr. 30, 1985

[54] PROCESS FOR PRODUCING AROMATIC SULFIDE POLYMER WITH ANHYDROUS AMORPHOUS VITREOUS COMPLEX DEHALOGENATION AGENT

[75] Inventors: Zenya Shiiki; Yo Iizuka; Yukichika Kawakami, all of Iwaki, Japan

[73] Assignee: Kureha Kagaku Kogyo Kabushiki Kaisha, Tokyo, Japan

[21] Appl. No.: 560,988

[22] Filed: Dec. 13, 1983

[30] Foreign Application Priority Data

Dec. 14, 1982 [JP] Japan ................................. 57-218784

[51] Int. Cl.$^3$ .............................................. C08G 75/16
[52] U.S. Cl. ..................................... 528/388; 528/391
[58] Field of Search ................................. 528/388, 391

[56] References Cited

U.S. PATENT DOCUMENTS

| 4,039,518 | 8/1977 | Campbell | 528/388 |
| 4,064,114 | 12/1977 | Edmonds | 528/388 |
| 4,303,781 | 12/1981 | Idel et al. | 528/388 |
| 4,368,321 | 1/1983 | Sherk et al. | 528/388 |

Primary Examiner—Harold D. Anderson
Attorney, Agent, or Firm—Wenderoth, Lind & Ponack

[57] ABSTRACT

A process for obtaining an aromatic sulfide polymer which has a markedly high molecular weight and can be readily formed into films, fibers, and other structures. The process comprises heating, to a temperature of 100° to 270° C. in an organic solvent under the coexistence of a very small amount of water, a dihaloaromatic compound and a substantially anhydrous amorphous vitreous compound composed of (i) $S^{2-}$ anions and other inorganic salt-forming anions and (ii) ions of an alkali metal and/or an alkaline earth metal.

9 Claims, No Drawings

PROCESS FOR PRODUCING AROMATIC SULFIDE POLYMER WITH ANHYDROUS AMORPHOUS VITREOUS COMPLEX DEHALOGENATION AGENT

BACKGROUND OF THE INVENTION

1. Field of the Art

This invention relates to a process for producing an aromatic sulfide polymer by subjecting a dihaloaromatic compound to dehalogenation/sulfidation reactions with a metal sulfide. More particularly, this invention relates to a process for producing an aromatic sulfide polymer having a markedly high molecular weight, characterized in that the polymerization reaction is conducted under specific conditions.

In recent years thermoplastic resins having ever increasing thermal resistance have been in demand for electronics parts, automobile parts, etc. Aromatic sulfide polymers may have such properties as to meet such a demand, but the conventional polymers of this class have been of high crystallinity, and, moreover, it has been difficult to obtain those of sufficiently high molecular weight. For this reason, there have been serious problems such as the difficulty of molding these polymers into films, sheets, fibers, etc. and the fragility of the resulting molded products. The present invention provides a novel process for producing a linear aromatic sulfide polymer having markedly high molecular weight to solve these problems.

2. Prior Art

Hitherto the following processes for producing aromatic sulfide polymers have been known.

(1) A process for melting and reacting elemental sulfur, dichlorobenzene and a base such as $Na_2CO_3$ in the absence of a solvent (U.S. Pat. Nos. 2,513,188, 2,538,941, etc.).

(2) A process in which an alkali metal sulfide, especially $Na_2S.9H_2O$, is heated in a polar solvent to remove its crystal water, and a mixture of the resulting anhydrous sulfide and dichlorobenzene is subjected to thermal polymerization (U.S. Pat. No. 3,354,129, etc.).

(3) A process similar to the above described process (2) in which $Na_2S.9H_2O$ is heated in a polar solvent containing a carboxylate salt caused to coexist therewith to remove its crystal water, and a mixture of the resulting anhydrous sulfide and dichlorobenzene is subjected to thermal polymerization (U.S. Pat. Nos. 3,919,177, 4,089,847, etc.).

As far as we are aware, these processes do not appear to be satisfactory. More specifically, the molecular weight of the resulting polymer according to the above described process (1) is too low, and it is difficult to obtain a linear aromatic sulfide polymer for practical uses. According to the above process (2), a polymer having molecular weight somewhat higher than that according to the above process (1) is obtained, but it is still difficult to obtain a linear aromatic sulfide polymer having satisfactory molecular weight for practical uses. The above process (3) has been developed to increase the molecular weight of the polymer prepared according to the process (2), whereby the molecular weight itself has been considerably improved. By the process (3), however, it is still rather difficult to readily produce films, sheets, fibers, etc. having great toughness in an economical manner with good reproducibility, as far as we are aware.

The difficulty of sufficiently raising the molecular weight in the above process (2) or (3) may be attributed to the following and other reasons. Since, in spite of the fact that the minute quantity of the coexisting water has a very great influence on the increase or decrease of the molecular weight, a process wherein the large quantity of water entering into the solvent from the starting material $Na_2S.9H_2O$ is evaporated off by heating in the solvent is adopted:

(a) complete dehydration is difficult, and control of the quantity of the dehydration is also difficult;

(b) with the process in a state wherein a considerable quantity of water content is still remaining, the heavy metal of the reaction vessel is corroded and undergoes dissolution, and the heavy metal ions inhibit the formation of a polymer of high molecular weight; and (c) during the evaporating of the water content, the sulfur content is also caused, in the form of $H_2S$ and the like, to accompany the water and is lost, whereby precise control of the sulfur content becomes difficult.

Moreover, a problem encountered in the process (3) is that, since a large number of water-soluble salts of organic acids, especially acetate, are caused to exist in the polymerization system, a large amount of organic acids is admixed with waste water used for treating the polymerization product, which may cause pollution problems. Furthermore, a great expenditure would be needed to remove the contaminated organic acid.

SUMMARY OF THE INVENTION

An object of the present invention is to overcome the above described difficulties of the conventional processes and to provide a process for producing an aromatic sulfide polymer which has markedly high molecular weight and can be suitably molded into films, sheets, fibers, etc. having great toughness. The present process, substantially, does not cause any pollution problems.

As a result of research we have conducted in order to obtain an aromatic sulfide polymer with high molecular weight, we have found that an aromatic sulfide polymer which has markedly high molecular weight and can be suitably molded into films, fibers, etc. is obtained by the reaction of a substantially anhydrous amorphous vitreous compound composed of the cationic species of alkali metal ions or alkaline earth metal ions used as a dehalogenation agent and the anionic species of both $S^{2-}$ used as a sulfur source and inorganic salt-forming anions other than the $S^{2-}$, with a dihaloaromatic compound. In this connection, the amorphous vitreous compound herein refers to a complex of plural ionic components wherein these ionic components have been substantially uniformly mixed in a molten state and then solidified into a solid ionic complex.

The present invention is based on the above stated finding. More specifically, in accordance with the present invention, there is provided a novel process for producing an aromatic sulfide polymer which comprises heating, to a temperature of 100° to 250° C. in an organic solvent in the presence of a very small amount of water added, a dihaloaromatic compound and a substantially anhydrous amorphous vitreous compound that is composed, via ionic bonding, of (i) (a) $S^{2-}$ and (b) inorganic salt-forming anions other than the $S^{2-}$ and (ii) cations of a metal selected from alkali metals and alkaline earth metals.

As for the terms "a dihaloaromatic compound", "a metal", and "a solvent" used herein, it should be understood that these terms refer to their respective compounds or substances and also encompass their mixtures within the ranges defined herein. For example, the present invention encompasses as an embodiment thereof the case where "a dihaloaromatic compound" consists of the compounds of plural species and especially two species, and the resulting aromatic sulfide polymer is an aromatic sulfide copolymer.

DETAILED DESCRIPTION OF THE INVENTION

Dihaloaromatic Compounds

The dihaloaromatic compounds to be used in the present invention, which corresponds to the monomers to form the skeletons of the resulting aromatic sulfide polymers, can be any aromatic compounds as long as they have aromatic nuclei and two halogen substituents on the nuclei thereof and as long as they can be polymerized via dehalogenation/sulfidation reactions with alkali or alkaline earth metal sulfides. Thus, the aromatic nuclei can consist of aromatic hydrocarbons and can be substituted aromatic compounds having substituents which do not impede the dehalogenation/sulfidation reactions.

More specifically, the dihaloaromatic compounds to be used in the present invention include, for example, the compounds represented by the following formulas.

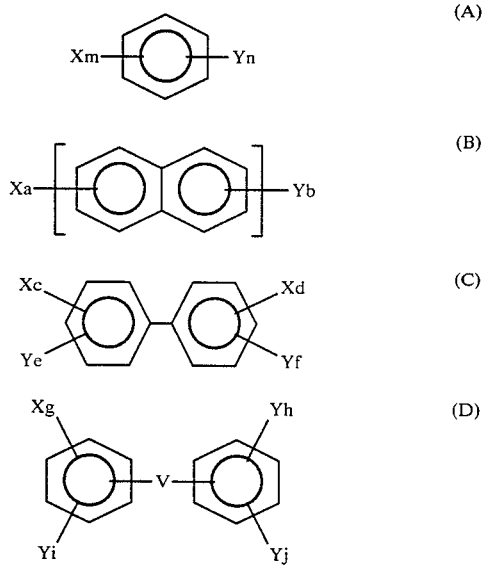

The substituents in the above described formulas are defined as follows:

X is a halogen selected from the group consisting of Cl, Br, I and F, preferably Cl or Br;

Y is a substituent selected from the group consisting of —R, —OR and —COOH, R being selected from the group consisting of an alkyl, a cycloalkyl, an aryl and an aralkyl, wherein the alkyl or alkyl moiety normally has 1 to about 18 carbon atoms and the aryl or aryl moiety normally has 6 to about 18 carbon atoms; and V is a substituent selected from the group consisting of

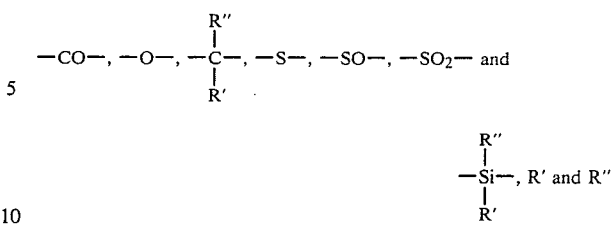

being selected from the group consisting of H, an alkyl, a cycloalkyl, an aryl and an aralkyl, wherein the alkyl or alkyl moiety and the aryl or aryl moiety are as defined above. In the formula (A), $m=2$ and $n$ is an integer defined by $0 \leq n \leq 4$; in the formula (B), $a=2$ and $b$ is an integer defined by $0 \leq b \leq 6$; in the formula (C), the c, d, e and f are integers defined by $0 \leq c \leq 2$, $0 \leq d \leq 2$, $c+d=2$, $0 \leq e$, and $f \leq 4$, respectively; and the g, h, i and j in the formula (D) are integers defined by $0 \leq g \leq 2$, $0 \leq h \leq 2$, $g+h=2$, $0 \leq i$, and $j \leq 4$, respectively.

The dihaloaromatic substituted compounds represented by the general formulas include, for example, p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, p,p'-dichlorodiphenyl ether, 4,4'-dichlorodiphenyl sulfone, 4,4'-dichlorodiphenyl sulfoxide, 4,4'-dichlorodiphenyl sulfide and 4,4'-dichlorobenzophenone. Among these, especially preferred are p-dichlorobenzene, m-dichlorobenzene, 4,4'-dichlorodiphenyl sulfone, 4,4'-dichlorobenzophenone and p,p'-dichlorodiphenyl.

The present sulfide polymer is a polymer of the above described dihaloaromatic compound(s). Thus, it is possible to concomitantly use a monohalo compound (not always an aromatic compound) for forming the end groups of the resulting polymer, or for controlling the polymerization reaction or molecular weight, and also to concomitantly use a multihalo compound having three or more halogen atoms (not always an aromatic compound) for forming a branched or crosslinked polymer. In the case where the above mentioned monohalo or polyhalo compound is a haloaromatic compound, the above specific examples of the resulting polymers will be easily recognized by those skilled in the art as monohalo- or polyhalo-derivatives of the above mentioned sulfide polymers.

Amorphous Vitreous Compounds

The amorphous vitreous compound, which is used as the sulfur source and the dehalogenation agent in the present polymerization reaction and as a reaction accelerator according to the present invention, is composed of a solid ionic complex comprising (a) $S^{2-}$ ions and (b) inorganic salt-forming inorganic ions other than $S^{2-}$ ions and cations of a metal selected from alkali metals and alkaline earth metals. The term "inorganic salt-forming" means that the inorganic anions exclude alkali-forming anions such as $OH^-$ ions.

The chemical structure of an amorphous vitreous compound wherein $CO_3^{2-}$, $Cl^-$ and $Br^-$ are used as the inorganic salt-forming anion species other than the $S^{2-}$ is illustrated below.

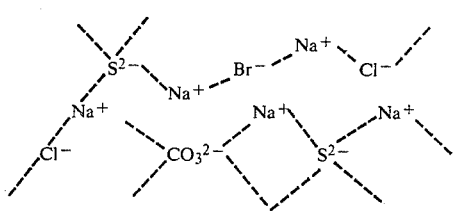

The characteristics of the present polymerization process will now be further described in detail. Because the present process uses an amorphous vitreous solid compound wherein both $S^{2-}$ and other inorganic salt-forming anions are randomly ion-bonded as chemical constituents, the following excellent effects are obtained:

(1) In respect to the polymerization reactivity, the use of the amorphous vitreous solid of the present invention prevents coagulation of the resulting polymer particles and thus acceleration of the polymeric propagation reaction occurs. This is because of the protective colloid action due to the $S^{2-}$-free inorganic finely-divided powder (NaCl, NaBr and $Na_2CO_3$ in the case of the above illustrated chemical structure) is released into the reaction system by the consumption of $S^{2-}$ in the surface layers of the vitreous solid particles in the course of the polymerization reaction. Further, the linear structure of the resulting polymer is assured due to the prevention of violent side reactions (such as branching reactions) by controlling the elution of $S^{2-}$ into the reaction system and prevention of a hydrolysis reaction is achieved by controlling the water content due to adsorption and desorption of free water in the reaction system.

(2) The handling and stability are improved by the use of the vitreous solids, oxidation is retarded and improved safety effects of $S^{2-}$-containing salts are achieved also, the chemical stabilization effects against the attack of moisture and $CO_2$ in the air are improved due to the coexistence of oxidation-resistant ions ($Cl^-$, $CO_3^{2-}$, etc.) other than $S^{2-}$.

(3) Environmental pollution is avoided due to the use of salts composed of inorganic ions in that almost no waste water pollution is caused as in the use of organic acid salts; thus a saving can be made in the costs for treating waste water.

(4) Finally, the properties of the resulting polymers are improved; the oxidation treatment (post-treatment) is uniform due to the broad surface areas of the resulting polymer particles; good spinnability in the course of processing is achieved due to the linear structure and the high molecular weight of the resulting polymer. Thus, the polymers exhibit good spinnability, processability (e.g., easy formability into films, sheets, fibers, pulps, bottles and the like), etc.

As described above, a variety of such excellent effects can be obtained by the use of the amorphous vitreous compound wherein both $S^{2-}$ and other anions which form inorganic salts are ion-bonded at random in accordance with the present invention.

The anion species other than $S^{2-}$, which are to be bonded together with the $S^{2-}$ in the amorphous vitreous compound to be used as the sulfur source and dehalogenation agent in the present invention, are inorganic salt-forming anions which preferably have no or minimized reducing and oxidizing properties. It is especially desired to use one or more of halogen ions ($Cl^-$, $Br^-$, $I^-$, etc.), carbonate ions ($CO_3^{2-}$), sulfate ions ($SO_4^{2-}$), sulfite ions ($SO_3^{2-}$), phosphate ions ($PO_4^{3-}$, $HPO_4^{2-}$, $PO_3^-$, $P_2O_7^{4-}$, $P_3O_{10}^{5-}$, etc.), borate ions ($BO_2^-$, $B_4O_7^{2-}$, etc.) and the like. Among these ions, the $CO_3^{2-}$ is preferred because it produces an aromatic sulfide polymer with especially high molecular weight. The anions other than $S^{2-}$, which form inorganic salts, are released into the reaction system in the form of $S^{2-}$-free salts as the polymerization reaction proceeds. The $S^{2-}$-free salts, however, are inorganic salts and do not cause waste water pollutions as in the case of organic salts.

The amorphous vitreous compound to be used as the sulfur source and dehalogenation agent in the present invention, as described above, needs as one of its essential constituents the anion species of $S^{2-}$ and one or more of inorganic salt-forming anions other than $S^{2-}$. The vitreous compound also needs, as another essential constituent, the cation species of one or more metal ions selected from alkali metal ions ($Li^+$, $Na^+$, $K^+$, etc.) and alkaline earth metal ions ($Ca^{2+}$, $Mg^{2+}$, $Ba^{2+}$, etc.).

The amorphous vitreous compound should be physicochemically electrically neutral and thus should satisfy the following expression;

$$\sum_i [Ai] = \sum_j [Bj]$$

wherein, [Ai]=gram equivalent number of the i-th cation species Ai, and [Bj]=gram equivalent number of the j-th anion species Bj.

It is preferable that the constitution ratio of $S^{2-}$ to inorganic salt-forming anions other than $S^{2-}$, which are the essential constituent anion species, be in the range of $S^{2-}$: the other anions=1: from 0.3 to 10 (q equiv./g equiv.). When the ratio of the inorganic acid-forming anions is smaller than the above specified range, the molecular weight of the resulting polymer does not become very high because the molecular weight-increasing effect due to double salt-forming action becomes insufficient. Conversely, when the ratio of the inorganic salt-forming anions other than $S^{2-}$ is greater than the range, the $S^{2-}$ content in the vitreous compound becomes lower, and as a result a large amount of the vitreous compound is required for the polymerization, which is not desirable from an economical point of view. It is preferable that the constitution ratio of $S^{2-}$ to the inorganic salt-forming anions other than $S^{2-}$ be especially in the range of 1: from 0.7 to 5 (g equiv./g equiv.), because then the polymer with the highest molecular weight can be economically obtained.

Incidentally, there are disclosed in the U.S. Pat. Nos. 3,919,177 and 4,089,847 the processes wherein, in order to make very small amounts of impurities in raw materials harmless, about an equivalent amount of an alkali substance such as sodium carbonate is added to the reaction system. In these cases, the amount of the carbonate added to a large amount of essential organic salts is very small (about 1/100 of the amount used in the present invention). Thus, the excellent effects as in the present invention cannot be obtained.

In the polymerization reaction system as described above, it is considered that most of the water present in the amorphous vitreous compound is chemically bonded in the vitreous compound. If a large amount of water should be present therein, such water will cause trouble in that it disturbs the structure of the vitreous compound and also decreases the molecular weight of the resulting polymer via hydrolysis or the like. It is thus desired that the amorphous vitreous compound be substantially anhydrous. The term "substantially anhydrous" herein means that the water content per gram equivalent of $S^{2-}$ is not more than 1.0 mol.

The substantially anhydrous amorphous vitreous compound to be used in the present invention can be obtained in principle according to the following method. The substantially anhydrous amorphous vitreous solid, wherein a specific quantity of $S^{2-}$ and a large quantity of the inorganic salt-forming anions other than $S^{2-}$ as well as a specific quantity of one or more of metal ions selected from alkali metal ions and alkaline earth metal ions are ion-bonded at random, can be obtained by uniformly dissolving these ions in water, and then subjecting the mixture to separation by rapid dehydration or rapid cooling, solidification and absolute drying (i.e., almost complete drying).

More specifically, the substantially anhydrous amorphous vitreous solid can be obtained by the following steps. The $S^{2-}$ anions and inorganic salt-forming anions other than $S^{2-}$ as well as one or more of metal ions selected from alkali metal ions and alkaline earth metal ions are dissolved uniformly in water, for example, (i) by adding an acidic gas or aqueous solution of $H_2S$ and $CO_2$, HCl and the like to an aqueous solution of the hydroxide or oxide of one or more metals selected from an alkali metal or an alkaline earth metal or (ii) by adding to water an alkali metal salt or alkaline earth metal salt or mixtures thereof containing a large amount of inorganic salt-forming anions and an alkali metal or alkaliine earth metal or mixtures thereof containing $S^{2-}$. Then, the resulting mixture is subjected to rapid thermal evaporation or rapid cooling to obtain the corresponding hydrous solid wherein the above mentioned ions are ion-bonded at random. The hydrous solid is then dried until it reaches an almost constant weight at reduced pressure of 150 torr or less, preferably 30 torr or less, and at a temperature 120° to 900° C., preferably 150° to 900° C.

As to the quantity of the substantially anhydrous amorphous vitreous compound to be used, it is preferable that the charged amount of the dihaloaromatic compound to be reacted therewith be in the range of 0.8 to 1.1 gram equivalent per the amount of the amorphous vitreous solid containing 1 g equivalent of the sulfur source $S^{2-}$. It is not desirable that the quantity of the vitreous compound be outside of the above defined range, because the molecular weight of the resulting polymer becomes lower. In order to obtain a linear polymer with high molecular weight, it is preferable that the above mentioned range be especially within 0.9 to 1.0 g equivalent. The fact that some excess amount of $S^{2-}$ is preferred in the present invention is markedly different from the conventional processes disclosed in the U.S. Pat. Nos. 3,354,129, 3,919,177 and 4,089,847.

Solvent and Water

It is desirable that the solvent to be used in the present polymerization reaction be an organic solvent having no active hydrogen, that is, an aprotic solvent. A solvent having active hydrogen is undesirable because the solvent itself may impede the polymerization reaction or the product formed by a reaction involving the active hydrogen may secondarily cause a harmful reaction.

The aprotic solvent should be stable at the temperature and alkaline condition which are encountered in the polymerization reaction of the present invention, and moreover it should not impede the present polymerization reaction unduly.

The solvent should have at least such solvency power as to dissolve the dihaloaromatic compound material and the above mentioned amorphous vitreous compound to produce $S^{2-}$ ions to a concentration necessary for the reaction. It is desirable that the "aprotic solvent" to be used be a polar solvent, that is, a solvent containing one or more atoms selected from nitrogen atom, oxygen atom and sulfur atom.

It is also desirable that the solvent not participate in the dehalogenation/sulfidation reactions in such a way that the dihaloaromatic compound material takes part in the reaction. For example, it is thus desirable that the solvent not be a dihaloaromatic hydrocarbon. If desired, however, it is possible to cause an excess amount of the dihaloaromatic compound material to act as a solvent. Accordingly, the term "in an organic solvent" used herein is intended to encompass the case where the dihaloaromatic compound material itself is used as a solvent, although it may appear that no solvent is present.

The solvent used in the present invention is also for providing a very small controlled amount of water for the polymerization reaction. Thus, it is desirable that the water as the solute can be solvated in the solvent. In the present invention, however, it is of no practical value to confirm whether the aprotic solvent and water are actually solvated or not. Thus it can be said that the amount of water to be added to the present polymerization reaction corresponds to the amount of water which has been solvated with the aprotic solvent, as detailed below.

Specific examples of such aprotic solvents are:
(1) amides such as hexamethylphosphoric triamide (HMPA), N-methylpyrrolidone (NMP), tetramethyl urea (TMU), dimethylformamide (DMF) and dimethyl acetamide (DMA); (2) etherified polyethylene glycols such as polyethyleneglycol dialkyl ether (degree of polymerization being about 2,000, the alkyl group having 1 to about 20 carbon atoms); (3) sulfoxides such as tetramethylene sulfoxide and dimethyl sulfoxide (DMSO); and (4) low-melting carboxylate salts such as an alkali metal isovalerate. Among these solvents, especially preferred as HMPA and NMP in view of their high chemical stability.

The amount of the organic solvent to be used is preferably in the range of 0.05 to 5 liters per the amount of the amorphous vitreous compound containing 1 g equivalent of $S^{2-}$. An amount of the solvent less than this range is undesirable because the viscosity of the reaction system becomes too high and uniform polymerization reaction is impeded. On the other hand, an amount of the solvent greater than the range is undesirable from the economical point of view because the amount of the solvent used becomes too large for the amount of polymer to be obtained.

In the present invention, it is necessary that a very small amount of water be present with the amorphous vitreous compound and dihaloaromatic compound. The quantity of water to be added is in the range of 0.03 to 1 mol, preferably 0.05 to 0.5 mol, per the amount of the amorphous vitreous compound containing 1 g equivalent of $S^{2-}$. It is considered that the water added is present as solvated water. A suitable amount of the water promotes the propagation in the reaction system, but a too large amount of water decreases the degree of polymerization of the resulting polymer. Thus the amount of water to be added is important. The polymer product with high molecular weight can be rapidly obtained by using a precisely measured amount of water within the above mentioned range.

Polymerization

The polymerization according to the present invention is caused to proceed by heating a reaction mixture comprising the above described components to a temperature in the range of 100° to 270° C. A temperature lower than 100° C. is undesirable from the economical point of view because of very low reaction rate. On the other hand, a temperature higher than 270° C. is also undesirable because the amorphous vitreous compound causes abnormal reactions such as exessive dehalogenation reaction, whereby the decomposition of the resulting polymer or the solvent may become too active. Expecially, a temperature in the range of 180° to 250° C. is preferred because a high-molecular polymer can be rapidly obtained. The polymerization reaction can be conducted at a constant temperature or can also be conducted by elevating the reaction temperature stepwise or continuously.

In the present polymerization process, it is preferable that a specific amount of a dihaloaromatic compound and a specific small amount of water be dissolved in the solvent, that fine powder of a specific amount of an amorphous vitreous compound be added thereto and dispersed uniformly, and that the resulting system be then subjected to thermal polymerization. It is also possible to add a portion or all of the fine powder of the amorphous vitreous compound in the course of the polymerization reaction. A variety of ordinary polymerization methods such as a batch system, a step-by-step system, and a continuous system can be employed.

It is desirable that the polymerization atmosphere be a non-oxidative atmosphere. For example, the empty interior of the polymerization system is preferably replaced with an inert gas such as nitrogen or argon before starting the polymerization reaction.

The resulting polymer can be separated out by the steps of heating the reaction mixture after termination of the reaction under reduced or atmospheric pressure to distill off only the solvent, then washing or extracting the residual solid product once or twice or more times with a solvent such as water, a ketone, an alcohol, an aromatic hydrocarbon, a halohydrocarbons, or an ether, carrying out neutralization, washing with water, filtrating, and drying. Another method for obtaining the polymer comprises adding to the reaction product after termination of the reaction a solvent such as water, an ether, a halohydrocarbon, an aromatic hydrocarbon or an aliphatic hydrocarbon as a precipitation agent, thereby precipitating the solid products such as the polymer and inorganic salts, and then carrying out filtration, washing or extracting and drying.

The polymerization methods described above do not use an organic salt as a molecular-weight-increasing agent. Thus, there exists no pollution problem due to an organic acid dissolved in washing water and released.

In accordance with suitable selection and combination of the dihaloaromatic compounds, a branched polymer or a copolymer having two or more different reaction units can be obtained as described above. For example, by the combination of dichlorobenzene used as the dihaloaromatic compound material and a small amount of, e.g., up to 10 mol % of the dihaloaromatic compound, of trichlorobenzene, a phenylene sulfide polymer having branched chains can be obtained. By the combination of p-dichlorobenzene and m-dichlorobenzene or p,p'-dichlorodiphenyl sulfone, a copolymer containing

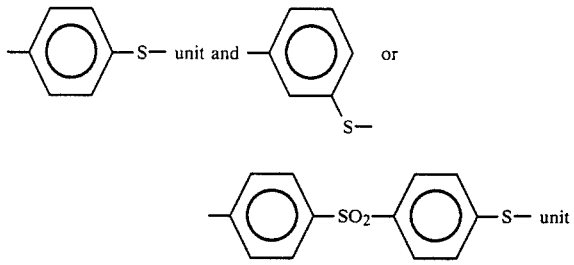

can be obtained.

Polymer Formed

The polymer obtained according to the present process is a linear polymer having a markedly high molecular weight in comparison with the conventional aromatic sulfide polymer. Thus, the polymer powder according to the present invention, as it is or with some oxidation treatment (e.g., at 200° to 400° C.) as necessary, shows excellent spinnability even at a high melt viscosity (e.g., having a melt viscosity of $10^4$ poise or more at 330° C.), and can be formed into films, sheets, fibers, etc. having toughness and thermal resistance. The present polymer powder can also be processed into molded articles by injection molding, extrusion, rotational molding, etc. The molded articles are substantially free from cracks even when they are thick.

Moreover, the polymer according to the present invention can be used by incorporating therein a powder filler such as carbon black, calcium carbonate powder, silica powder, or titanium oxide powder or a fiber filler such as carbon fiber, glass fiber, asbestos, or polyamide fiber.

The present polymer can also be used by blending therewith one or more synthetic resins such as polyetheretherketone, polyethersulfone, polyhydroxybenzoate, polycarbonate, polyphenylene oxide, polysulfone, polyarylene, polyacetal, polyimide, polyester, polystyrene, and ABS.

The following examples are intended to illustrate the present invention without undue limitation thereof.

EXAMPLES 1 THROUGH 21

Preparation of Amorphous Vitreous Compounds (a) A solution was prepared by dissolving 800.0 mols of NaOH in 60 liters of hot water, and blowing thereinto 200.0 mols of $CO_2$ gas and then 200.0 mols of $H_2S$ gas to dissolve therein $S^{2-}$, $CO_3^{2-}$ and $Na^+$. The resulting solution was flush-evaporated and rapidly solidified by means of a rotary evaporator to obtain hydrous solid containing 64 mols of water. The resulting solid was dried in a vacuum drier under reduced pressure of 3 torr at 225° C. until it reached a constant weight (for about 1 day) to obtain an absolutely dried amorphous vitreous compound A ($S^{2-}/CO_3^{2-}/Na^+ = 1:1:2$ g equivalent ratio). The water content of the dried compound was 0.05 mol or less per gram equivalent of $S^{2-}$.

(b) Solutions were prepared by dissolving 80.0 mols of KOH or $LiOH.H_2O$ in 6 liters of hot water, and blowing thereinto 20.0 mols of $CO_2$ gas and then 20.0 mols of $H_2S$ gas to dissolve $S^{2-}$, $CO_3^{2-}$ and $K^+$ or Li+, respectively. Each solution was treated as in the above described steps (a) to obtain an amorphous vitreous compound B1 ($S^{2-}/CO_3^{2-}/K^+ = 1:1:2$ g equiv. ratio) or B2 ($S^{2-}/CO_3^{2-}/Li^+ = 1:1:2$ g equiv. ratio). The water content of each of the absolutely dried compounds was 0.05 mol or less.

(c) Solutions were prepared by dissolving 40.0 mols each of sodium hydroxide in 6 liters of hot water, dissolving therein 20.0 g equivalent each of NaCl, NaBr, $Na_2SO_4$, $Na_3PO_4$, $Na_2HPO_4$, $NaPO_3$, $Na_4P_2O_7$, $Na_5P_3O_{10}$ or $Na_2B_4O_7$, and then blowing thereinto 20.0 mols each of $H_2S$ to dissolve $Na^+$, $S^{2-}$ and the corresponding inorganic ions therein, respectively. Each of the resulting solutions was treated as in the steps (a) to obtain the corresponding absolutely dried amorphous vitreous compound $C_n$.

| | |
|---|---|
| $C_1(S^{2-}/Cl^-/Na^+$ | $= 1:0.5:1.5$ g equivalent ratio) |
| $C_2(S^{2-}/Br^-/Na^+$ | $= 1:0.5:1.5$ g equivalent ratio) |
| $C_3(S^{2-}/SO_4^{2-}/Na^+$ | $= 1:0.5:1.5$ g equivalent ratio) |
| $C_4(S^{2-}/PO_4^{3-}/Na^+$ | $= 1:0.5:1.5$ g equivalent ratio) |
| $C_5(S^{2-}/HPO_4^{2-}/Na^+$ | $= 1:0.5:1.5$ g equivalent ratio) |
| $C_6(S^{2-}/PO_3^-/Na^+$ | $= 1:0.5:1.5$ g equivalent ratio) |
| $C_7(S^{2-}/P_2O_7^{4-}/Na^+$ | $= 1:0.5:1.5$ g equivalent ratio) |
| $C_8(S^{2-}/P_3O_{10}^{5-}/Na^+$ | $= 1:0.5:1.5$ g equivalent ratio) |
| $C_9(S^{2-}/B_4O_7^{2-}/Na^+$ | $= 1:0.5:1.5$ g equivalent ratio) |

The water content was 0.05 mol or less per g equivalent of $S^{2-}$.

(d) A solution was prepared by dissolving 60.0 mols sodium hydroxide, 16.0 mols potassium hydroxide and 2.0 mols barium hydroxide in 6 liters of hot water, and blowing thereinto 20.0 mols $CO_2$ gas and then 20.0 mols $H_2S$ gas to dissolve therein $Na^+$, $K^+$, $Ba^{2+}$, $S^{2-}$ and $CO_3^{2-}$. The resulting solution was treated as in the steps (a) to obtain an absolutely dried amorphous vitreous compound $D(S^{2-}/CO_3^{2-}/Na^+/K^+/Ba^{2+} = 1:1:1.5:0.4:0.1$ g equivalent ratio).

The water content was 0.05 mol or less per g equivalent of $S^{2-}$.

(e) A solution was prepared by dissolving 20.0 mols NaHS, 20.0 mols NaOH, 10.0 mols NaCl and 10.0 mols NaBr in 6 liters of hot water to dissolve therein $Na^+$, $S^{2-}$, $Cl^-$ and $Br^-$. The resulting solution was treated as in the steps (a) to obtain an absolutely dried amorphous vitreous compound $E(S^{2-}/Cl^-/Br^-/Na^+ = 1:0.25:0.25:1.5$ g equivalent ratio). The water content was 0.05 mol or less per g equivalent of $S^{2-}$.

(f) Solutions were prepared by dissolving 20.0 mols each of $Na_2S.9H_2O$ in 1.5 liters of hot water, adding thereto 40.0 mols of $Na_2CO_3$ or 8.0 mols of $Na_2CO_3$, and heating the mixture in a nitrogen stream to 180° C. to dissolve $Na_2CO_3$, in each case. The resulting solutions were treated as in the steps (a) to obtain the corresponding absolutely dried amorphous vitreous compound $F_1(S^{2-}/CO_3^{2-}/Na^+ = 1:2:3$ g equivalent ratio) and $F_2(S^{2-}/CO_3^{2-}/Na^+ = 1:0.4:1.4$ g equivalent ratio), respectively. The water content was 0.05 mol or less per g equivalent of $S^{2-}$.

(g) A solution was prepared by dissolving 20.0 mols of $Na_2S.9H_2O$ in 1.5 liters of hot water, adding thereto 20.0 mols of $CaCO_3$, and heating the mixture in a nitrogen stream to 180° C. to dissolve the $CaCO_3$. The resulting solution was treated as in the steps (a) to obtain an absolutely dried amorphous vitreous compound $G(S^{2-}/CO_3^{2-}/Na^+/Ca^{2+} = 1:1:1:1$ g equivalent ratio). The water content was 0.05 mol or less per g equivalent of $S^{2-}$.

Polymerization

A 20 liter stainless steel autoclave with stirring vanes was charged with a specific amount of a solvent. A precisely measured amount of water and a specific amount of a dihaloaromatic compound were added thereto and dissolved. A specific amount of each ground amorphous vitreous solid, which had been prepared in the examples for preparation of amorphous vitreous compounds, was added to each of the resulting solutions. The autoclave was purged with nitrogen gas, sealed, and stirred at 100° C. for 30 minutes to disperse the ground amorphous vitreous solid uniformly. The mixture was then heated to a polymerization temperature to carry out polymerization.

After termination of the polymerization, the polymerization mixture was cooled, taken out of the autoclave, evaporated under reduced pressure at 110° to 130° C. by means of a rotary evaporator to distil off the solvent, washed with acetone, and filtered. The filtered cake was dispersed in water, neutralized with dilute HCl, and then filtered. The cake was further purified by repeating washing with hot water and filtration three times, and then dried at 70° C. overnight to obtain an aromatic sulfide polymer.

The melt viscosity of the resulting polymer was measured by means of a Koka-type flow tester (300° C., load of 50 Kgs).

The results of these examples are shown in Table 1.

TABLE 1

| Example No. | Amorphous vitreous compound | | Halogen-substituted aromatic compound | | Water added (mol) | Solvent | | Polymerization conditions | | Melt viscosity of resulting polymer (poise) |
|---|---|---|---|---|---|---|---|---|---|---|
| | type | charged*1 amount (g equivalent) | type | charged amount (g equivalent) | | type | charged amount (l) | temperature (°C.) | time (Hrs) | |
| 1 | A | 30.0 | p-DCB*2 | 28.0 | 8.0 | NMP*6 | 15 | 210 | 18 | 2310 |
| 2 | $B_1$ | 30.0 | " | 28.0 | 8.0 | " | 15 | 220 | 10 | 1100 |
| 3 | $B_2$ | 30.0 | p-DCB 1,3,5-TCB*3 | 27.85 0.15 | 8.0 | " | 15 | 210 | 18 | 12050 |
| 4 | $C_1$ | 30.0 | p-DCB | 28.0 | 8.0 | " | 15 | 210 | 18 | 1520 |
| 5 | $C_2$ | 30.0 | " | 28.0 | 10.0 | " | 15 | 210 | 18 | 1170 |
| 6 | $C_3$ | 30.0 | " | 28.0 | 8.0 | " | 15 | 220 | 10 | 1130 |
| 7 | $C_4$ | 30.0 | " | 28.0 | 8.0 | " | 15 | 230 | 6 | 1020 |
| 8 | $C_5$ | 20.0 | " | 18.5 | 5.0 | " | 15 | 210 | 18 | 1220 |
| 9 | $C_6$ | 30.0 | " | 30.0 | 8.0 | HMPA*7 | 10 | 210 | 18 | 1300 |
| 10 | $C_7$ | 30.0 | " | 28.0 | 8.0 | NMP | 15 | 210 | 18 | 1180 |
| 11 | $C_8$ | 30.0 | p-DCB m-DCB*4 | 20.0 8.0 | 8.0 | " | 15 | 210 | 18 | 330 |
| 12 | $C_9$ | 30.0 | p-DCB DCDPS*5 | 26.0 2.0 | 20.0 | " | 15 | 190 | 40 | 300 |
| 13 | D | 30.0 | p-DCB | 28.0 | 8.0 | " | 15 | 210 | 18 | 1820 |

TABLE 1-continued

| Example No. | Amorphous vitreous compound type | Amorphous vitreous compound charged*1 amount (g equivalent) | Halogen-substituted aromatic compound type | Halogen-substituted aromatic compound charged amount (g equivalent) | Water added (mol) | Solvent type | Solvent charged amount (l) | Polymerization conditions temperature (°C.) | Polymerization conditions time (Hrs) | Melt viscosity of resulting polymer (poise) |
|---|---|---|---|---|---|---|---|---|---|---|
| 14 | E | 30.0 | " | 28.0 | 8.0 | " | 15 | 210 | 18 | 1410 |
| 15 | F$_1$ | 30.0 | " | 28.0 | 8.0 | " | 15 | 210 | 18 | 2690 |
| 16 | F$_2$ | 30.0 | " | 28.0 | 8.0 | " | 15 | 210 | 18 | 1090 |
| 17 | A | 30.0 | " | 26.0 | 8.0 | " | 15 | 210 | 18 | 1990 |
| 18 | A | 30.0 | " | 30.0 | 8.0 | " | 15 | 210 | 18 | 2220 |
| 19 | A | 30.0 | " | 28.0 | 5.0 | " | 15 | 210 | 18 | 2550 |
| 20 | A | 30.0 | " | 28.0 | 12.0 | " | 15 | 210 | 18 | 1400 |
| 21 | K | 30.0 | " | 28.0 | 8.0 | " | 15 | 210 | 18 | 2290 |

Note:
*1 quantity of $S^{2-}$ in g equivalent contained therein
*2 p-dichlorobenzene
*3 1,3,5-trichlorobenzene
*4 m-dichlorobenzene
*5 dichlorodiphenyl sulfone
*6 N—methyl pyrrolidone
*7 hexamethylphosphoric triamide

COMPARATIVE EXAMPLES 1 THROUGH 9

Preparation of Amorphous Vitreous Compounds (h) A solution was prepared by dissolving 40.0 mols NaOH in 4 liters of hot water, adding and dissolving 20.0 mols CH$_3$COONa, and then blowing thereinto 20.0 mols of H$_2$S gas to dissolve Na$^+$, S$^{2-}$ and CH$_3$COO$^-$ therein. The resulting solution was treated as in the above described steps (a) to obtain an absolutely dried amorphous vitreous compound H(S$^{2-}$/CH$_3$COO$^-$/Na$^+$ = 1:0.5:1.5 g equivalent ratio). The water content was 0.05 mol or less per g equivalent of S$^{-2}$.

(i) A solution was prepared by dissolving 46.0 mols NaOH in 6 liters of hot water, and blowing thereinto 3.0 mols of CO$_2$ gas and then 20.0 mols of H$_2$S gas to dissolve Na$^+$, S$^{2-}$ and CO$_3^{2-}$. The resulting solution was treated as in the steps (a) to obtain an absolutely dried amorphous vitreous compound I(S$^{2-}$/CO$_3^{2-}$/Na$^+$ = 1:0.15:1.15 g equivalent ratio). The water content was 0.03 mol or less per g equivalent of S$^{2-}$.

(j) A solution was prepared by dissolving 80.0 mols NaOH in 6 liters of hot water and blowing thereinto 40.0 mols H$_2$S gas to dissolve Na$^+$ and S$^{2-}$. The resulting solution was treated as in the steps (a) to obtain an absolutely dried amorphous vitreous compound J(S$^{2-}$/Na$^+$ = 1:1 g equivalent ratio). The water content was 0.05 mol or less per g equivalent of S$^{2-}$.

(k) A solution was prepared by dissolving 80.0 mols NaOH in 6 liters of hot water, and blowing thereinto 20.0 mols CO$_2$ gas and then 20.0 mols H$_2$S gas to dissolve Na$^+$, S$^{2-}$ and CO$_3^{2-}$. The resulting solution was flush-evaporated and rapidly solidified by means of a rotary evaporator and the solid was heated under reduced pressure at 120° C. for 5 hours. Thus, a hydrous amorphous vitreous compound K was obtained (S$^{2-}$/CO$_3^{2-}$/Na$^+$ = 1:1:2 g equivalent ratio). The water content of the resulting compound was 1.7 mols per g equivalent of S$^{2-}$.

Polymerization

Polymerization were carried out in the same way as in Examples by using each of the amorphous vitreous compounds H, I, J and K prepared in the Comparative Examples 1 to 9 above and the Compound A prepared in the Examples 1 to 21 above. The results are shown in Table 2.

Comparative Example 1 illustrates the case where a simple salt containing S$^{2-}$ ions and no other anions was used; Comp. Example 2 the case where the amount of the anions other than S$^{2-}$ contained in the amorphous vitreous solid was too small; Comp. Example 3 the case where the amorphous vitreous solid contains organic acid ions (CH$_3$COO$^-$) as the anions other than S$^{2-}$; and Comp. Example 4 the case where a simple salt and NaCl powder were simply mixed in the polymerization system, respectively. The melt viscosity of each of the resulting polymers was markedly low in comparison with those of the polymers obtained in Example 1 or 4.

Comparative Examples 5 and 6 illustrate the cases where the amount of the dihaloaromatic compound relative to the amount of S$^{2-}$ was excessive or insufficient, respectively. The melt viscosity of each of the resulting polymers was markedly low in comparison with that of the polymer obtained in Example 1.

Comparative Examples 7 and 8 illustrate the cases where the water added to the polymerization system was excessive or insufficient, respectively. Comparative Example 9 illustrates the case where the amorphous vitreous compound used was not a substantially anhydrous compound but a hydrous compound. The melt viscosity of each of the resulting polymers was markedly low in comparison with that obtained in Example 1.

COMPARATIVE EXAMPLE 10

The apparatus as used in Example 1 was charged with 13 liters of N-methylpyrrolidone (NMP). To the NMP were added 15.0 mols of sodium sulfide 9 hydrate, 15.0 mols of sodium acetate 3 hydrate and 0.75 mol of sodium carbonate 10 hydrate. The mixture was heated in a nitrogen stream at 160° to 200° C. for 2 hours to evaporate and decrease the water contained in the hydrated salts. To the reaction system was further added 15.3 mols of p-DCB dissolved in 2 liters of NMP. The resulting mixture was heated to and maintained at 250° C. for 3.5 hours to carry out polymerization reaction. The reaction mixture was treated as in Example 1 to obtain a polymer. The melt viscosity of the resulting polymer was as low as 110 poise and was markedly low in comparison with that of the polymer obtained in Example 1.

TABLE 2

| Comp. Example No. | Amorphous vitreous compound type | Amorphous vitreous compound charged*[1] amount (g equivalent) | Halogen-substituted aromatic compound type | Halogen-substituted aromatic compound charged amount (g equivalent) | Water added (mol) | Solvent type | Solvent charged amount (l) | Polymerization conditions temperature (°C.) | Polymerization conditions time (Hrs) | Melt viscosity of resulting polymer (poise) |
|---|---|---|---|---|---|---|---|---|---|---|
| 1 | J | 30.0 | p-DCB | 28.0 | 8.0 | NMP | 15 | 210 | 18 | 210 |
| 2 | I | 30.0 | " | 28.0 | 8.0 | " | 15 | 210 | 18 | 240 |
| 3 | H | 30.0 | " | 28.0 | 8.0 | " | 15 | 210 | 18 | 180 |
| 4*[2] | J | 30.0 | " | 28.0 | 8.0 | " | 15 | 210 | 18 | 240 |
| 5 | A | 30.0 | " | 35.0 | 8.0 | " | 15 | 210 | 18 | 15 |
| 6 | A | 30.0 | " | 22.5 | 8.0 | " | 15 | 210 | 18 | 30 |
| 7 | A | 30.0 | " | 28.0 | 40.0 | " | 15 | 210 | 18 | 120 |
| 8 | A | 30.0 | " | 28.0 | 0.01 | " | 15 | 210 | 18 | 160 |
| 9 | K | 30.0 | " | 28.0 | 8.0 | " | 15 | 210 | 18 | 110 |

*[1] See the footnote to Table 1.
*[2] Polymerization was carried out by addition of 15.0 mols of NaCl powder to the polymerization system.

What is claimed is:

1. A process for producing a high molecular weight aromatic sulfide polymer which comprises heating, to a temperature of 100° to 270° C. in a composition comprising (1) an organic solvent, (2) a very small amount of water, (3) a dihaloaromatic compound and (4) a substantially anhydrous amorphous vitreous compound that is a solid ionic complex produced by the contact of (i) (a) $S^{2-}$ and (b) inorganic salt-forming anions other than the $S^{2-}$ and (ii) ions of a metal selected from an alkali metal or an alkaline earth metal in an aqueous solution followed by drying, the amount of the dihaloaromatic compound being 0.8 to 1.1 g equivalent with respect to the amount of the amorphous vitreous compound containing 1 g equivalant of $S^{2-}$.

2. The process according to claim 1, in which the inorganic salt-forming anions are one or more members selected from $CO_3^{2-}$, $Cl^-$, $Br^-$, $I^-$, $SO_4^{2-}$, $SO_3^{2-}$, $PO_4^{3-}$, $HPO_4^{2-}$, $PO_3^-$, $P_2O_7^{4-}$, $P_3O_{10}^{5-}$, $BO_2^-$, or $B_4O_7^{2-}$.

3. The process according to claim 1, in which the inorganic salt-forming anions comprise $CO_3^{2-}$.

4. The process according to claim 1, in which the alkali metal ions are $Li^+$, $Na^+$ or $K^+$ and the alkali metal ions are $Ca^{2+}$, $Mg^{2+}$ or $Ba^{2+}$.

5. The process according to claim 1, in which the ratio of the quantity of $S^{2-}$ to that of the inorganic salt-forming anions other than $S^{2-}$ is in the range of 1:(0.3 to 10)(g equivalent/g equivalent).

6. The process according to claim 1, in which the amount of added water is 0.01 to 1 mol with respect to the amount of the amorphous vitreous compound containing 1 g equivalent of $S^{2-}$.

7. The process according to claim 1, in which the amount of the organic solvent is 0.05 to 5 liters with respect to the amount of the amorphous vitreous compound containing 1 g equivalent of $S^{2+}$.

8. The process according to claim 1, in which the dihaloaromatic compound is dichlorobenzene.

9. The process according to claim 1, in which the dihaloaromatic compound contains a minor amount of a polyhalo-aromatic compound having at least three halogen atoms.